United States Patent [19]

More et al.

[11] 3,996,089
[45] Dec. 7, 1976

[54] METHOD FOR THE HANDLING OF PRE-IMPREGNATED COMPOSITE TAPES

[75] Inventors: Edwin R. More, Simsbury, Conn.; Harry A. Nutter, Jr., Longmeadow, Mass.

[73] Assignee: United Technologies Corporation, Hartford, Conn.

[22] Filed: Apr. 30, 1975

[21] Appl. No.: 573,040

[52] U.S. Cl. .................................. 156/235; 83/29; 156/248; 156/264; 156/268; 156/285
[51] Int. Cl.² ........................................ B32B 31/00
[58] Field of Search ............ 156/63, 234, 235, 239, 156/230, 247, 248, 264, 265, 285, 289, 299, 256–257, 268; 83/28, 29, 27, 922

[56] References Cited
UNITED STATES PATENTS

| | | | |
|---|---|---|---|
| 2,607,711 | 8/1952 | Hendricks | 156/249 |
| 2,710,820 | 6/1955 | Hilborn et al. | 156/239 |
| 3,014,828 | 12/1961 | Reese | 156/247 |
| 3,345,240 | 10/1967 | O'Herron | 156/264 |
| 3,532,574 | 10/1970 | Davis | 156/239 |
| 3,574,026 | 4/1971 | Kuchek | 156/247 X |
| 3,598,006 | 8/1971 | Gerber et al. | 83/29 X |
| 3,615,094 | 10/1971 | Connor | 156/257 |
| 3,738,888 | 6/1973 | Williams | 156/247 X |

*Primary Examiner*—William A. Powell
*Assistant Examiner*—M. G. Wityshyn
*Attorney, Agent, or Firm*—John D. Del Ponti

[57] ABSTRACT

Composite materials comprised of reinforcing filaments captured in an uncured resinous matrix are shaped and subsequently stacked by a technique which may be automated. The composite material, in tape form, is sandwiched between liners, the liners being selected or treated so as to exhibit an adhesion differential with respect to the tacky uncured resin, and the plies of the resultant multilayer article are thereafter cut, the upper liner removed and the plies stacked utilizing the ply-to-ply adherence.

10 Claims, 8 Drawing Figures

METHOD FOR THE HANDLING OF PRE-IMPREGNATED COMPOSITE TAPES

BACKGROUND OF THE INVENTION

The Invention herein described was made in the course of or under a contract or subcontract with the Department of the Air Force.

1. Field of the Invention

The present invention relates to composite materials and particularly to the fabrication of articles from laminates wherein each layer is a composite tape consisting of uniformly distributed fibers captured in a matrix material. More specifically, this invention is directed to techniques for the manipulation of composite tapes, which tapes include a resinous matrix material in the uncured state, to achieve the shaping and stacking of such composites as a step in the fabrication of usable structures therefrom. Accordingly, the general objects of the present invention are to provide novel and improved methods of such character.

2. Description of the Prior Art

A composite material, as this term is now well known in the art, consists of a metallic or organic matrix material reinforced by a plurality of filaments. Composite materials are known to possess highly desirable physical characteristics. These desirable characteristics result from the fact that materials produced in fibrous or filament form frequently exhibit a higher elastic modulus and, accordingly, higher stiffness and strength than is possessed by the corresponding materials in homogeneous isentropic form. Filaments typically used in composite materials include boron, graphite, glass and resins. Considering commercially available boron filaments for purposes of explanation, such filaments actually comprise a layer of amorphous boron which has been deposited on a tungsten wire substrate by a technique such as the known $BCl_3$—$H_2$ process disclosed in U.S. Pat. No. 3,549,427.

Composite materials are customarily supplied to end users in tape form and include "continuous" lengths of filaments of high modulus embedded in a matrix. In the composite the matrix material is employed to hold and support the filaments in alignment and to absorb the loads between filaments whereby the composite material will act as a structural unit. It is, accordingly, essential that the filaments in each layer be arranged with a prescribed orientation to each other in order to insure proper functioning of the matrix material. In order to successfully function, the matrix material must be capable of absorbing loads transverse to the filaments and in shear between the filaments.

A typical process for the production of composite tapes contemplates the precoating of the filaments with a resinous matrix material and the subsequent gathering together of the thus coated filaments and passing them between pressure rollers to form a tape. As an alternative approach, a plurality of filaments may be disposed in a flat array in a horizontal plane and a film of resin applied over the array; parallelism and proper spacing of the filaments thereafter being obtained by rolling to thereby force the matrix material between adjacent filaments.

The production of high modulus composites, of which turbine engine fan blades and vanes are examples, requires the cutting of desired ply shapes from monolayer tape material followed by the stacking of the thus generated layers of plies into a preform for molding of the desired end product. These operations, known in the art as "ply generation and stacking", have previously been performed manually or by strip laying of tape. Restated, the practice in the art has been to hand or die cut individual plies using templates or die cutters followed by hand lay up of each individual ply with the aid of various locating methods incorporating window templates or pins. Hand cutting techniques are subject to shape, filament orientation and positional errors due to variability in the use of hand shears, hand roll cutters or cutter die placement. The hand stacking placement of each ply generally requires an alignment of one edge for intitial contact and subsequent ironing down of the remainder of the ply; a tecnique which allows distortion of the ply to meet remaining edge location requirements. Both of the above-mentioned hand operations also present the possibility of contamination of the uncured resin matrix material. Subsequent to stacking the multilayer structure is subjected to temperature and pressure in a mold to produce compaction, layer-to-layer bonding and, in the case of resinous matrix material, curing.

As should be obvious from the immediately preceding discussion, manual ply generation and stacking is time consuming and piecemeal in nature. These considerations, coupled with the possibility of the above-mentioned errors, have precluded the manufacture of composite items on a large production scale and have created a need for manufacturing techniques with increased speed and accuracy, and with reduced labor costs and material waste. The above described problems have proved to be particularly troublesome in the case of monolayer composite tapes having a resinous matrix material. As implied above, composites with a resinous matrix are produced in the uncured or "prepreg" condition. Many uncured resin matrix materials exhibit surface tackiness as a result of the type of resin or the amount of solvents used in preparation. Thus, because of the tacky adhesive nature of the pre-impregnated matrix material prior to its curing a temperature, resinous composite tapes are extremely difficult to handle and the cutting and stacking of such "prepreg" composite tapes has been a very time consuming and consequently expensive hand operation.

SUMMARY OF THE INVENTION

The present invention overcomes the above briefly discussed and other deficiencies and disadvantages of the prior art by providing a novel technique for the manipulation of pre-impregnated monolayer composite tapes having a tacky resinous matrix material. The process of the present invention includes the pick-up and precision stacking of plies of "prepreg" or uncured monolayer composite tape in a manner which may be subject to automated or mechanized production equipment.

In accordance with the invention the composite material; i.e., a pre-impregnated monolayer tape; is sandwiched between layers of protective material. The protective materials, hereinafter referred to as the liners, are selected or configured such that the adhesive force or tack of the upper liner to the composite is less than that of the lower liner to the composite. The composite tape, with liners adhesively held thereto, is placed on a cutting table and held in position by means of a vacuum. An automated reciprocating cutter thereafter generates the plies by cutting through the upper liner and the composite tape; the layers of the desired end product thus being formed in place as a predetermined distributed pattern. Subsequent to ply generation the upper liner; i.e., the low tack protective layer; is stripped from the upper surface of the plies of the desired end product. An automated stacking head may then be employed to pick up and compact the plies in sequence with each subsequently picked up piece of prepreg tape being oriented such that the pieces are in their designated and required location relative to one another. During the stacking procedure, which deposits the plies on the pick-up head, the adhesive tack of the exposed upper ply surfaces is utilized to achieve ply-to-ply adherence and the lower liner will remain on the cutting table since the adhesive attraction between plies of the composite and the vacuum hold of the lower liner to the table are both greater than the adhesive attachment of the composite tape to the lower liner. After stacking has been completed the precision stacked plies are removed from the pick-up head for final compaction and curing.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT:

In discussing the present invention it will be understood that the "prepreg" composite tapes are either produced in a manner known in the art or obtained from a standard commercial source. Composite tapes are presently commercially available in widths of 3, 12 or 36 inches and typically have a nominal uncured thickness of 0.007 inches. Commercially available composite tapes include parallelly oriented filaments of boron, graphite, fiberglass, polyimide, etc.

Figure 1:
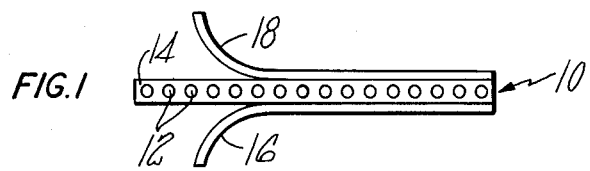
FIG. 1 is a schematic representation, in cross-section, of a pre-impregnated composite tape as will be used in accordance with the invention, FIG. 1 depicting the upper and lower liners applied to the tape.

With reference to FIG. 1, a "perpreg" tape, shown in cross-section, is indicated generally at 10. Tape 10 comprises a plurality of parallel filaments 12 dimensionally stabilized by an uncured resinous matrix material 14. The matrix material will typically comprise an epoxy but may also consists of a polyimide resin. Typical resinous matrix materials are those epoxies known in the art as SP- 288and SP-308 available from 3Company, St. Paul, Minnesota. The "prepreg" composite tapes are also available from 3M Company and other sources. The "prepreg" tape 10 is, as a result of the presence of the uncured resinous matrix material 14, tacky and easily disturbed and is thus difficult to handle.

In the course of manufacture, the "prepreg" composite tape is provided with a release coated backing paper on one side in the interest of facilitating handling with minimal contamination and also in the interest of permitting rolling for storage and the subsequent stripping of the tape off of a roll when needed. The protective backing or liner may, for example, be a release coated Kraft paper stock. This protective backing is preferably, but not necessarily, employed as one of the liners in accordance with the practice of the invention as will be described below.

In accordance with an initial step in the practice of the invention, the rolls of uncured composite tape are removed from cold storge and permitted to warm to cutting room temperature. Next, the composite tape 10 is unrolled on the surface of a vacuum table; the vacuum table being indicated at 20 in FIG. 2A. When the protective backing provided by the tape manufacturer is employed as the lower liner 16, the backing will be positioned in contact with the vacuum table surface. However, if the properties of the protective backing provided by the manufacturer are not suitable for the practice of the present invention, a suitable liner material will first be placed on the vacuum table and the exposed tacky surface of the composite tape will be brought into contact with and thus adhesively tacked to the liner. The protective backing provided by the manufacturer will subsequently be stripped from the top of the tape. When the tape and lower liner 16 are properly positioned on the vacuum table, and the upper tacky surface of the composite tape is exposed, an upper liner 18 will be unrolled on top of the tape material on the vacuum table or may be overlayered on the "prepreg" material during its manufacture.

To summarize the initial set-up operation, the composite tape 10 is prepared for ply generation and stacking by insuring that liners are applied to the oppositely disposed surfaces thereof. The material comprising the liners 16 and 18 is selected, processed or utilized such that there is less adhesion between the liner 18 on the upper side of tape 10 and the tape than between the lower or bottom liner 16 and the tape. The upper liner 18 will, accordingly, hereinafter be referred to as the "lower tack" liner whereas the liner 16 will hereinafter be referred to as the "higher tack" liner. In order to accomplish the requisite adhesion differential between the liners and tape it is possible to employ different materials for the two liners or the same material may be employed and the degree of tack controlled by reducing the contact area between the liner and tape by forming perforations in the low tack liner or by applying different surface coatings to the liner. The separators may be comprised of paper or plastic. In one reduction to practice the lower liner 16 comprised a silicone coated paper of 0.007 inches thickness and 60 pound weight. This release paper was employed by the tape manufacturer as a protective backing and thus is supplied with the "prepreg" composite tape. The silicone coated paper offers the advantages of dimensional stability, low expense and low release value. A polyethylene film of 0.0015 to 0.0020 inches thickness has been found to be a particularly suitable upper liner 18. In one reduction to practice of the invention the polyethylene film was obtained from 3M Company and may be identified by manufacturer's specification No. RM-8838. The upper liner 18 is preferably colored so as to be easily distinguishable from composite tape 10.

As noted above, the composite tape 10 with liners 16 and 18 respectively applied to the lower and upper surfaces thereof, is positioned on the surface of vacuum table 20. The tape, while being held in position by suction applied from below the surface of vacuum table 20, is cut to form a plurality of plies of the desired size, shape and filament orientation. Cutting is preferably accomplished by means of a reciprocating cutter head which has been indicated schematically and generally at 22 in FIG. 2A. The cutter head 22 is provided with a cutter foot, not shown, which rides directly on the surface of liner 18. The cutter foot will be formed of a low-friction material so as to insure that it will freely slide on the "release" surface of the upper liner. The cutter itself is preferably a chisel pointed tool comprised of carbide, steel or diamond. The cutter will be reciprocated, through a fixed stroke, at an operating speed which may be 6,000 strokes per minute. The position of the foot of the cutter head is adjusted such that the tool will pass through the "lower tack" liner 18 and composite tape 10 but not through "higher tack" liner 16. The movements of the cutter head over the table surface will preferably be tape controlled and thus the cutter head will be preset to a starting position and the ply generation will thereafter proceed automatically. The outline of various plies of the desired end product are indicated in FIG. 2 with several of the plies having been labeled.

Figure 3:
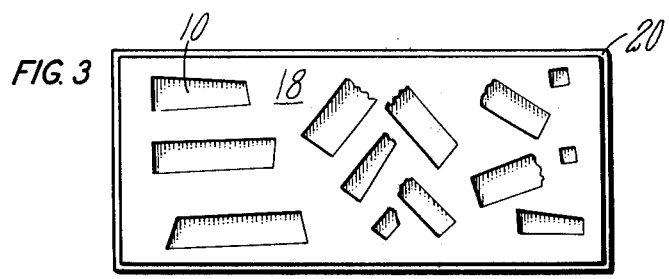
FIGS. 3 and 3A represent a further step in the practice of the invention, the step of FIG. 3 being performed subsequent to the step of FIG. 2.
Figure 3A:
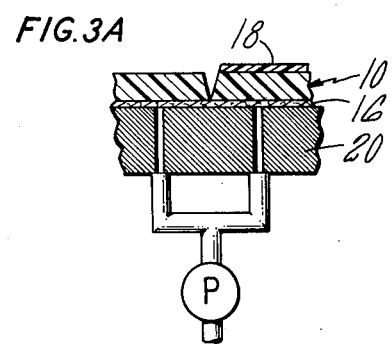

Subsequent to the ply generation or cutting operation, the pieces of "lower tack" liner 18 separated from the main body of liner 18 during cutting are stripped from the tape. This stripping step is shown schematically in FIGS. 3 and 3A. The stripping step is presently performed manually and includes freeing an edge or corner within each ply region followed by removal of the cut-out portion of the upper liner. The stripping operation may, however, also be performed automatically. The stripping of the cut-out pieces of "lower tack" liners 18 from the composite tape is possible due to the above-discussed adhesion differential; i.e., the attraction between the vacuum table and the "higher tack" liner 16 and between the "prepreg" tape 10 and the "higher tack" liner are both greater than the adhesion of the "lower tack" liner 18 to the composite tape.

Figure 2:
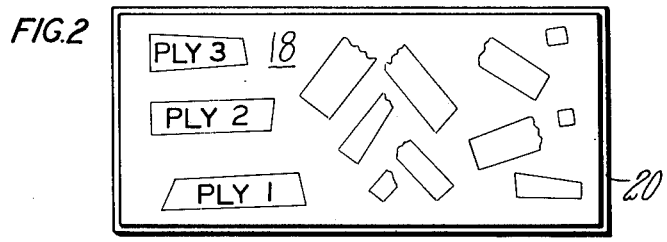
FIGS. 2 and 2A represent a step in the practice of the present invention.
Figure 2A:
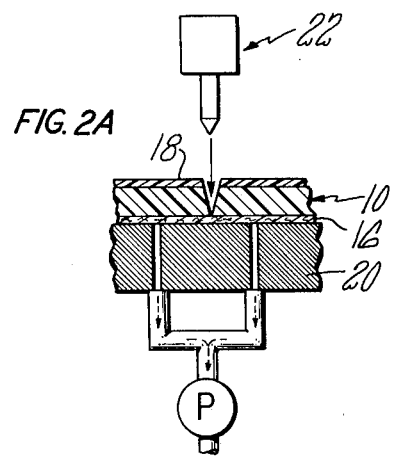
Figure 4:
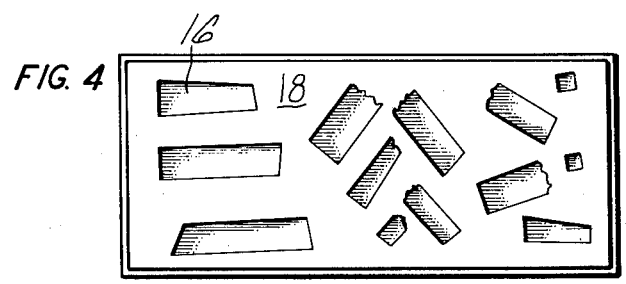
FIGS. 4 and 4A represent a still further step, performed subsequent to the step of FIG. 3, in accordance with the practice of the present invention.
Figure 4A:
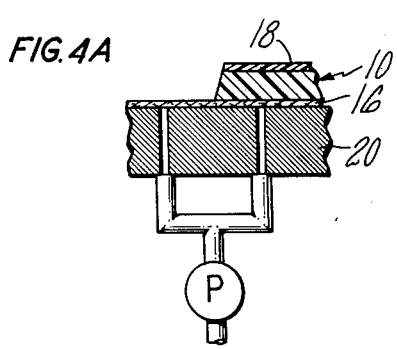
Figure 5:
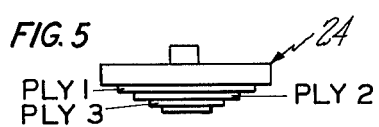
FIG. 5 schematically represents the plies generated in the step of FIG. 2 stacked on a pick-up head during the performance of the step depicted in FIG. 4.

The next step in the practice of the present invention consists of the sequential stacking of the plies formed during the cutting step of FIGS. 2 and 2A. The ply stacking operation is depicted in FIGS. 4 and 5. The stacking will typically be performed with the aid of a pick-up head, indicated generally at 24 in FIG. 5, which is capable of rotation, elevation and manipulation. The pick-up head 24 will be positioned over the cut-out ply which is to form one layer of the desired stack. Thereafter the head, operating under the control of a numerical tape in a similar manner to the cutting head 22, will be caused to descend to the surface of vacuum table 20 to pick up the first ply. The adhesion between the pick-up head and initial ply must be sufficient to overcome the adherence of the composite tape to the "higher tack" liner 16 but not so great as to prevent the final removal of the stack from the head. The pick-up head may be provided with a covering, for example a removable facing band, which will form a sufficiently strong, albeit temporary, adhesive bond with the surface of the composite tape. After the first ply has been picked up on the head, the head will be sequentially positioned over the plies, will be rotated to the appropriate angular relationship, and will descend so as to produce contact between the tacky resinous surfaces of the previously picked up ply and the next ply to be picked up. The adhesive tack between contacting ply surfaces will be greater than the adhesion between the "higher tack" liner 16 and tape 10. The attraction between "higher tack" liner 16 and vacuum table 20 will afford the strongest bond in the system; albeit a temporary bond. Accordingly, in step by step fashion, the plies are sequentially stacked on the pick-up head by utilizing the adhesive tack of the exposed ply upper surfaces. At the conclusion of the stacking procedure the precision stacked plies are manually removed from the pick-up head for further processing. This further processing will include inspection usually followed by exposure of the stack to elevated temperature and pressure in a mold to produce compaction, layer-to-layer bonding and curing of the matrix material. Thereafter the molded laminate may be subjected to further manufacturing operations to form a completed product. It is, of course, possible that several stacks produced in accordance with the present invention will be integrated and simultaneously bonded and cured in a single step.

To summarize, the present invention affords a method of automated and mechanized processing of uncured resin matrix filament reinforced tapes into forms suitable for subsequent molding and curing processes in such a manner as to greatly increase the accuracy of assembly of the piled layers of tape material and as to greatly reduce, over the generally current hand methods, the possiblility of contamination and disturbance of the material in its uncured and fragile state.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for the formation of a multilayer article, the article comprising a plurality of plies of a composite including reinforcing filaments captured in uncured resinous matrix material, said method comprising the steps of:

sandwiching a composite tape between a pair of liners, the adhesive attraction between the upper liner and the resinous matrix material being less than the adhesive attraction between the lower liner and the resinous matrix material;

positioning the composite tape and liners on a cutting table;

cutting the upper liner and composite tape to define a plurality of plies of the multilayer article being formed;

removing the severed portions of the upper liner from the plies defined during cutting; and serially removing and stacking the composite tape plies defined during cutting from the lower liner, the plies of tape being stacked simultaneously with removal from the lower liner, the adhesive attraction between contacting surfaces of adjacent plies of tape being greater than the adhesive attraction of the tape to the lower liner and being employed to achieve removal and stacking.

2. The method of claim 1 wherein the step of cutting comprises:

reciprocating a cutting blade in a plane transverse to the surface of the cutting table to thereby generate the required ply shapes.

3. The method of claim 1 wherein the step of positioning the composite tape and liners on a cutting table comprises:
arranging the tape on the surface of a vacuum table; and
drawing a vacuum from beneath the table surface to cause the tape and liners to be held against the table surface with a force greater than the adhesive attraction of either liner to the resinous matrix material.

4. The method of claim 3 wherein the step of cutting comprises:
reciprocating a cutting blade in a plane transverse to the surface of the cutting table to thereby generate the required ply shapes.

5. The method of claim 1 wherein the step of sandwiching the tape between liners comprises:
applying a release coated backing paper to the first side of a composite tape, the release coated paper forming the lower liner; and
applying a layer of material which exhibits a weaker adhesive bond to the matrix material than the release coated paper to the opposite side of the tape to establish an adhesion differential between the liners and tape.

6. The method of claim 5 wherein the step of applying the layer of liner material to the opposite side of the tape comprises:
overlaying the upper side of the tape with a polyethylene film.

7. The method of claim 4 further comprising the step of:
subjecting the stacked plies of composite tape to heat and pressure to produce compaction and curing of the resinous matrix material.

8. The method of claim 5 wherein the step of positioning the composite tape and liners on a cutting table comprises:
arranging the tape on the surface of a vacuum table; and
drawing a vacuum from beneath the table surface to cause the tape and liners to be held against the table surface with a force greater than the adhesive attraction of either liner to the resinous matrix material.

9. The method of claim 8 wherein the step of cutting comprises:
reciprocating a cutting blade in a plane transverse to the surface of the cutting table to thereby generate the required ply shapes.

10. The method of claim 9 further comprising the step of:
subjecting the stacked plies of composite tape to heat and pressure to produce compaction and curing of the resinous matrix material.

* * * * *